United States Patent
Gu et al.

(10) Patent No.: US 11,662,197 B2
(45) Date of Patent: May 30, 2023

(54) RAPID MEASUREMENT METHOD FOR ULTRA-THIN FILM OPTICAL CONSTANT

(71) Applicant: HUAZHONG UNIVERSITY OF SCIENCE AND TECHNOLOGY, Hubei (CN)

(72) Inventors: Honggang Gu, Hubei (CN); Shiyuan Liu, Hubei (CN); Simin Zhu, Hubei (CN); Baokun Song, Hubei (CN); Hao Jiang, Hubei (CN); Xiuguo Chen, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 833 days.

(21) Appl. No.: 16/510,983

(22) Filed: Jul. 15, 2019

(65) Prior Publication Data

US 2020/0333132 A1 Oct. 22, 2020

(30) Foreign Application Priority Data

Apr. 19, 2019 (CN) .......................... 201910315604.8

(51) Int. Cl.
*G01B 11/06* (2006.01)
(52) U.S. Cl.
CPC ............................... *G01B 11/0641* (2013.01)
(58) Field of Classification Search
CPC .......................... G01B 11/641; G01B 11/0641
(Continued)

(56) References Cited

U.S. PATENT DOCUMENTS

| 5,956,147 A * | 9/1999 | Jellison, Jr. .......... G01N 21/211 356/369 |
| 9,235,668 B1 * | 1/2016 | Poiroux ............ H01L 29/78696 |
| 2017/0115112 A1 * | 4/2017 | Srocka ................... G01B 11/06 |

OTHER PUBLICATIONS

Peep Adamson, "A new ellipsometric approach for determining dielectric function of graphene in the infrared spectral region," Journal of Modern Optics, vol. 64, Issue 3, Sep. 7, 2016, pp. 1-9.

(Continued)

*Primary Examiner* — Tarifur R Chowdhury
*Assistant Examiner* — Omar H Nixon
(74) *Attorney, Agent, or Firm* — JCIPRNET

(57) ABSTRACT

The invention discloses a rapid measurement method for an ultra-thin film optical constant, which includes following steps: S1: using a p-light amplitude reflection coefficient $r_p$ and an s-light amplitude reflection coefficient $r_s$ of an incident light irradiating to an ultra-thin film to be measured to express an amplitude reflection coefficient ratio $\rho$ of the ultra-thin film:

$$\rho = \frac{r_p}{r_s};$$

S2: performing a second-order Taylor expansion to $$\rho = \frac{r_p}{r_s}$$

at $d_f=0$ while taking $2\pi d_f/\lambda$ as a variable to obtain a second-order approximation form; S3: performing merging, simplifying and substituting processing to the second-order approximation form for transforming the same into a one-variable quartic equation; S4: solving the one-variable quar- (Continued)

tic equation to obtain a plurality of solutions of the optical constant of the ultra-thin film, and obtaining a correct solution through conditional judgment, so as to achieve the rapid measurement for the ultra-thin film optical constant.

8 Claims, 5 Drawing Sheets

(58) Field of Classification Search
USPC .......................................................... 702/172
See application file for complete search history.

(56) References Cited

OTHER PUBLICATIONS

Gwang-Hun Junga et al., "Measuring the optical permittivity of twodimensional materials without a priori knowledge of electronic transitions," Journal of Nanophotonics, vol. 8, Issue 2, Sep. 29, 2018, pp. 263-270.

\* cited by examiner

RAPID MEASUREMENT METHOD FOR ULTRA-THIN FILM OPTICAL CONSTANT

CROSS-REFERENCE TO RELATED APPLICATION

This application claims the priority benefit of China patent application serial no. 201910315604.8, filed on Apr. 19, 2019. The entirety of the above-mentioned patent application is hereby incorporated by reference herein and made a part of this specification.

BACKGROUND

Technical Field

The invention relates to a measurement and characterization research field of ultra-thin film optical properties, and particularly relates to a rapid measurement method for an ultra-thin film optical constant.

Description of Related Art

Along with rapid development of optoelectronic technology, etc., an application scope of thin films has gradually expanded, and many ultra-thin films with thickness of only tens or even a few nanometers have become a current research hotspot. Optical constants of ultra-thin films are very important in basic scientific research and design and optimization of nano-optical devices, and the optical constants of the ultra-thin films will change along with thickness and preparation conditions, etc., so that the information in existing literatures or databases cannot be simply used. Therefore, it is very important to achieve fast and accurate measurement of the ultra-thin film optical constants.

The optical constant measurement and characterization methods of ultra-thin films mainly include a photometric method, a prism coupling method, interferometry, ellipsometry, etc. The photometric method determines a thickness of the thin film based on a transmittance and a reflectance of the thin film measured by a spectrophotometer, and includes an envelope method and a full spectrum fitting method, etc., where the envelope method is the most commonly used one, but it generally requires a thicker thin film, which is not suitable for the ultra-thin films. The prism coupling method is a contact measurement method to determine a thickness and a refractive index of a thin film by placing a coupling prism on a sample surface of the thin film to introduce incident light into the measured thin film, and detecting and analyzing reflected light of different incident angles to determine a coupling angle of a waveguide film, where a measured thickness thereof cannot reach a scale range of the ultra-thin film. The interferometry is to determine a refractive index of thin films by using coherent light interference to form equal thickness interference fringes, which also has the same problem with that of the above methods. The ellipsometry measurement has advantages of non-destructive non-contact, high sensitivity and high precision, and its sensitivity to thickness may reach 0.01 nm, but the ellipsometry is an indirect measurement method, which requires computer fitting to obtain the thickness and optical constants (including a refractive index and an extinction coefficient) of the thin film. The ellipsometry measurement is an indirect measurement method, which detects geometric parameters and optical properties of a sample by measuring a change of a polarization state of light before and after the light is incident to the sample surface, and a measurement result needs to be fitted to an optical model by an algorithm to obtain the optical constants. Commonly used fitting methods include a point-to-point method and a oscillator model fitting method, where the point-to-point method is to give an initial value, and the optical constants of the ultra-thin film needs to be accurately estimated, otherwise it is easy to fall into a local optimal solution and cannot solve the correct optical constants; the oscillator model fitting method uses Lorenz oscillator, etc., and it is necessary to learn a knowledge of electronic transitions of the ultra-thin film in advance, and match measurement data to obtain the optical constants of the ultra-thin film. Regarding the ultra-thin film, properties such as electronic transitions thereof are often not well known, which leads to errors for a oscillator model fitting process. Therefore, to implement measurement of the ultra-thin film optical constants is a difficult point in the existing measurement technology.

In view of the above problems combined with the geometric properties of the ultra-thin film, some researchers have proposed a Taylor-expansion approximate direct calculation method based on an amplitude reflection coefficient ratio $\rho$, and in 2017, Peep Adamson of Estonia (A new ellipsometric approach for determining dielectric function of graphene in the infrared spectral region. Journal of Modern Optics, 2017, 64 (3): 272-279) performed a first-order approximation on the amplitude reflection coefficient ratio $\rho$ of the ellipsometric parameters for graphene and similar materials on a transparent substrate, and by solving an approximate formula, calculation formulas of refractive index and extinction coefficient are obtained, and simulating calculation of graphene in an infrared band is performed; in 2018, Gwang-Hun Jung, et al. of Korea (Measuring the optical permittivity of two dimensional materials without a priori knowledge of electronic transitions [J]. Nanophotonics. 2018) adopted a similar method to perform first-order derivation on the amplitude reflection coefficient ratio $\rho$ of p-light and s-light, and calculation formulas of refractive index and extinction coefficient of the ultra-thin film are obtained by solving the first-order equation, and by measuring and calculating two-dimensional materials such as molybdenum disulfide, tungsten disulfide and tungsten diselenide thin film on a sapphire substrate, it is verified that the method may calculate the optical constants of ultra-thin film more accurately in case of a longer wavelength band without a priori knowledge. The above two methods provide a new idea for determining the optical constants of the ultra-thin films, but there are also defects of limited calculation bands, and large errors occur in calculation of optical constants of a shorter wavelength range such as an ultraviolet band, etc.

SUMMARY

In view of the above defects or improvement requirements of the existing technology, the invention provides a rapid measurement method for an ultra-thin film optical constant, by performing second-order Taylor expansion approximation on an amplitude reflection coefficient ratio, and by calculating and solving approximate formulas, the optical constant of the ultra-thin film is measured rapidly, which has advantages of fast measurement, accurate measurement, etc., and is adapted to rapid measurement and characterization of optical constants for arbitrary ultra-thin film.

In order to achieve the above purpose, the invention provides a rapid measurement method for an ultra-thin film optical constant, which includes following steps:

S1: using a p-light amplitude reflection coefficient $r_p$ and an s-light amplitude reflection coefficient $r_s$ of an incident light irradiating to an ultra-thin film to be measured to express an amplitude reflection coefficient ratio $\rho$ of the ultra-thin film:

$$\rho = \frac{r_p}{r_s};$$

S2: performing a second-order Taylor expansion to $$\rho = \frac{r_p}{r_s}$$

at $d_f=0$ while taking $2\pi d_f/\lambda$ as a variable to obtain a second-order approximation form:

$$\rho \approx \rho_0 + i\rho' \frac{2\pi d_f}{\lambda} + (\rho_1'' + \rho_2'')\left(\frac{2\pi d_f}{\lambda}\right)^2$$

Where $\rho_0$ is an amplitude reflection coefficient ratio of a substrate used by the ultra-thin film, $d_f$ is a thickness of the ultra-thin film, $\lambda$ is a wavelength of the incident light, and $\rho'$, $\rho_1''$ and $\rho_2''$ are all coefficients;

S3: performing merging, simplifying and substituting processing to the second-order approximation form for transforming the same into a one-variable quartic equation;

S4: solving the one-variable quartic equation to obtain a plurality of solutions of the optical constant of the ultra-thin film, and obtaining a correct solution through conditional judgment, where the correct solution is the optical constant of the ultra-thin film to be measured, so as to achieve the rapid measurement for the ultra-thin film optical constant.

Preferably, the p-light amplitude reflection coefficient $r_p$ is calculated according to a following equation:

$$r_p = \frac{n_{sub}\cos\alpha_{inc} - n_0\cos\alpha_{tra} + i\frac{2\pi d_f}{\lambda}(n_f^2\cos\alpha_{inc}\cos\alpha_{tra} - n_0 n_{sub} + n_0 n_{sub}^3\sin^2\alpha_{tra}/n_f^2)}{n_{sub}\cos\alpha_{inc} + n_0\cos\alpha_{tra} + i\frac{2\pi d_f}{\lambda}(n_f^2\cos\alpha_{inc}\cos\alpha_{tra} + n_0 n_{sub} - n_0 n_{sub}^3\sin^2\alpha_{tra}/n_f^2)}$$

Where $n_{sub}$ is an optical constant of the substrate used by the ultra-thin film, $\alpha_{inc}$ is an incident angle of the incident light, $n_0$ is an optical constant of a surrounding medium of the ultra-thin film, $\alpha_{tra}$ is a refraction angle of the incident light transmitted to the substrate, $d_f$ is a thickness of the ultra-thin film, $\lambda$ is a wavelength of the incident light, and $n_f$ is an optical constant of the ultra-thin film to be measured.

Preferably, the s-light amplitude reflection coefficient $r_s$ is calculated according to a following equation:

$$r_s = \frac{n_0\cos\alpha_{inc} - n_{sub}\cos\alpha_{tra} + i\frac{2\pi d_f}{\lambda}(n_0 n_{sub}\cos\alpha_{inc}\cos\alpha_{tra} + n_{sub}^2\cos\alpha_{inc}^2 - n_f^2)}{n_0\cos\alpha_{inc} + n_{sub}\cos\alpha_{tra} + i\frac{2\pi d_f}{\lambda}(n_0 n_{sub}\cos\alpha_{inc}\cos\alpha_{tra} - n_{sub}^2\cos\alpha_{inc}^2 + n_f^2)}$$

Where $n_{sub}$ is an optical constant of the substrate used by the ultra-thin film, $\alpha_{inc}$ is an incident angle of the incident light, $n_0$ is an optical constant of the surrounding medium of the ultra-thin film, $\alpha_{tra}$ is a refraction angle of the incident light transmitted to the substrate, $d_f$ is a thickness of the ultra-thin film, $\lambda$ is a wavelength of the incident light, and $n_f$ is an optical constant of the ultra-thin film to be measured.

Preferably, $\rho'$ is calculated according to a following equation:

$$\rho' = -2\frac{n_0}{n_{sub}^2 - n_0^2}\frac{\sin^2\alpha_{inc}\cdot\cos\alpha_{inc}}{\cos^2(\alpha_{inc}-\alpha_{tra})}\frac{(n_f^2 - n_0^2)\cdot(n_f^2 - n_{sub}^2)}{n_f^2}$$

Where $n_0$ is an optical constant of the surrounding medium of the ultra-thin film, $\alpha_{inc}$ is an incident angle of the incident light, $n_f$ is an optical constant of the ultra-thin film to be measured, $n_{sub}$ is an optical constant of the substrate used by the ultra-thin film, and $\alpha_{tra}$ is a refraction angle of the incident light transmitted to the substrate.

Preferably, $\rho_1''$ is calculated according to a following equation:

$$\rho_1'' = -2\frac{n_0 n_{sub}}{(n_{sub}^2 - n_0^2)^2}\cdot\frac{\sin^2\alpha_{inc}\cdot\cos^2\alpha_{inc}}{\cos^3(\alpha_{inc}-\alpha_{tra})}\left(\frac{(n_f^2 - n_0^2)(n_f^2 - n_{sub}^2)}{n_f^2}\right)^2$$

Where $n_0$ is an optical constant of the surrounding medium of the ultra-thin film, $\alpha_{inc}$ is an incident angle of the incident light, $n_f$ is an optical constant of the ultra-thin film to be measured, $n_{sub}$ is an optical constant of the substrate used by the ultra-thin film, and $\alpha_{tra}$ is a refraction angle of the incident light transmitted to the substrate.

Preferably, $\rho_2''$ is calculated according to a following equation:

$$\rho_2'' = -2\frac{n_0}{n_{sub}}\frac{\cos\alpha_{inc}}{(n_{sub}^2 - n_0^2)^2}\cdot\frac{\sin^2\alpha_{inc}\cdot\cos\alpha_{inc}}{\cos^2(\alpha_{inc}-\alpha_{tra})}$$

$$\left(\frac{(n_f^2 - n_0^2)(n_f^2 - n_{sub}^2)}{n_f^2}\right)\left(\frac{(n_f^2 - n_0^2)n_{sub}^4 + (n_f^2 - n_{sub}^2)n_f^2 n_0^2}{n_f^2}\right)$$

Where $n_0$ is an optical constant of the surrounding medium of the ultra-thin film, $\alpha_{inc}$ is an incident angle of the incident light, $n_f$ is an optical constant of the ultra-thin film to be measured, $n_{sub}$ is an optical constant of the substrate used by the ultra-thin film, and $\alpha_{tra}$ is a refraction angle of the incident light transmitted to the substrate.

Preferably, the step S3 of performing merging, simplifying and substituting processing to the second-order approximation form for transforming the same into the one-variable quartic equation includes:

S31: letting:

$$A = -2\frac{n_0}{n_{sub}^2 - n_0^2}\frac{\sin^2\alpha_{inc}\cdot\cos\alpha_{inc}}{\cos^2(\alpha_{inc}-\alpha_{tra})}$$

$$B = -2\frac{n_0 n_{sub}}{(n_{sub}-n_0)^2}\cdot\frac{\sin^2\alpha_{inc}\cdot\cos^2\alpha_{inc}}{\cos^3(\alpha_{inc}-\alpha_{tra})}$$

-continued $$C = -2\frac{n_0}{n_{sub}} \frac{\cos\alpha_{inc}}{(n_{sub}^2 - n_0^2)^2} \cdot \frac{\sin^2\alpha_{inc} \cdot \cos\alpha_{inc}}{\cos^2(\alpha_{inc} - \alpha_{tra})}$$

$$D = \frac{2\pi d_f}{\lambda}$$

S32: simplifying the second-order approximation form into:

$$\rho = \rho_0 + iAD\frac{(n_f^2 - n_0^2) \cdot (n_f^2 - n_{sub}^2)}{n_f^2} + BD^2\left(\frac{(n_f^2 - n_0^2)(n_f^2 - n_{sub}^2)}{n_f^2}\right)^2 +$$

$$CD^2\left(\frac{(n_f^2 - n_0^2)(n_f^2 - n_{sub}^2)}{n_f^2}\right)\frac{(n_f^2 - n_0^2)n_{sub}^4 + (n_f^2 - n_{sub}^2)n_f^2 n_0^2}{n_f^2}$$

S33: expanding and simplifying the equation of the step S32 to obtain a one-variable quartic equation related to $n_f^2$:

para4·$N_f^4$+para3·$N_f^3$+para2·$N_f^2$+para1·$N_f$+para0=0

Where $N_f$=$n_f^2$, para0, para1, para2, para3 and para4 are respectively a constant term, a one-order term coefficient, a quadratic term coefficient, a cubic term coefficient and a quartic term coefficient.

Preferably, the constant term para0, the one-order term coefficient para1, the quadratic term coefficient para2, the cubic term coefficient para3 and the quartic term coefficient para4 are represented as:

para0=$BD^2n_0^4n_{sub}^4 - CD^2n_0^4n_{sub}^6$ para1=$iADn_0^2n_{sub}^2 - 2BD^2n_0^4n_{sub}^2 - 2BD^2n_0^2n_{sub}^4 + 2CD^2n_0^2n_{sub}^6$ para2=$-iADn_0^2 + BD^2n_0^4 - iADn_{sub}^2 + 4BD^2n_0^2n_{sub}^2 + 2CD^2n_0^4n_{sub}^2 + BD^2n_{sub}^4 - CD^2n_0^2n_{sub}^4 - CD^2n_{sub}^6 - \rho + \rho_0$ para3=$iAD - 2BD^2n_0^2 - CD^2n_0^4 - 2BD^2n_{sub}^2 - 2CD^2n_0^2n_{sub}^2 + CD^2n_{sub}^4$ para4=$BD^2 + CD^2n_0^2$ Preferably, the step S4 of obtaining the correct solution through conditional judgment includes: excluding optical constant solutions that do not satisfy physical conditions, and introducing remaining optical constant solutions satisfying the physical conditions into a Fresnel equation to calculate ellipsometric parameters of the ultra-thin film, and determining the correct solution according to a degree of fitness between the calculated ellipsometric parameters and ellipsometric parameters of the ultra-thin film obtained through the measurement.

In overall, compared with the prior art, the above technical scheme conceived by the invention has following technical advantages:

By performing Taylor second-order expansion to the amplitude reflection coefficient ratio ρ of the ultra-thin film (generally refers to a thin film material with a thickness less than 10 nm), a Taylor second-order equation is adapted to achieve an approximation of the amplitude reflection coefficient ratio ρ, at the same time, a non-linear equation that is originally unable to obtain analytical solutions is transformed into a one-variable quartic equation, so as to obtain the analytical solutions of the ultra-thin film optical constant through calculation. Compared with the existing methods for calculating the ultra-thin film optical constant, the method of the invention does not need to have a thorough understanding of the electronic transition of the material, and it does not need to estimate the initial value of the optical constant in a solving process. The method of the invention has no special limitation on the wavelength range and may be applied to the measurement of optical constants in a wider wavelength range. The method of the invention still has high measurement accuracy in the short wavelength range, accurate calculation results and small error, and which is very important for determination of the optical constants of the newly appeared ultra-thin films.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. It should be understood that the specific embodiments described herein are merely used for explaining the invention and are not intended to be limiting of the invention. Furthermore, the technical features involved in the various embodiments of the invention described below may be combined with each other as long as they do not conflict with each other.

Figure 1:
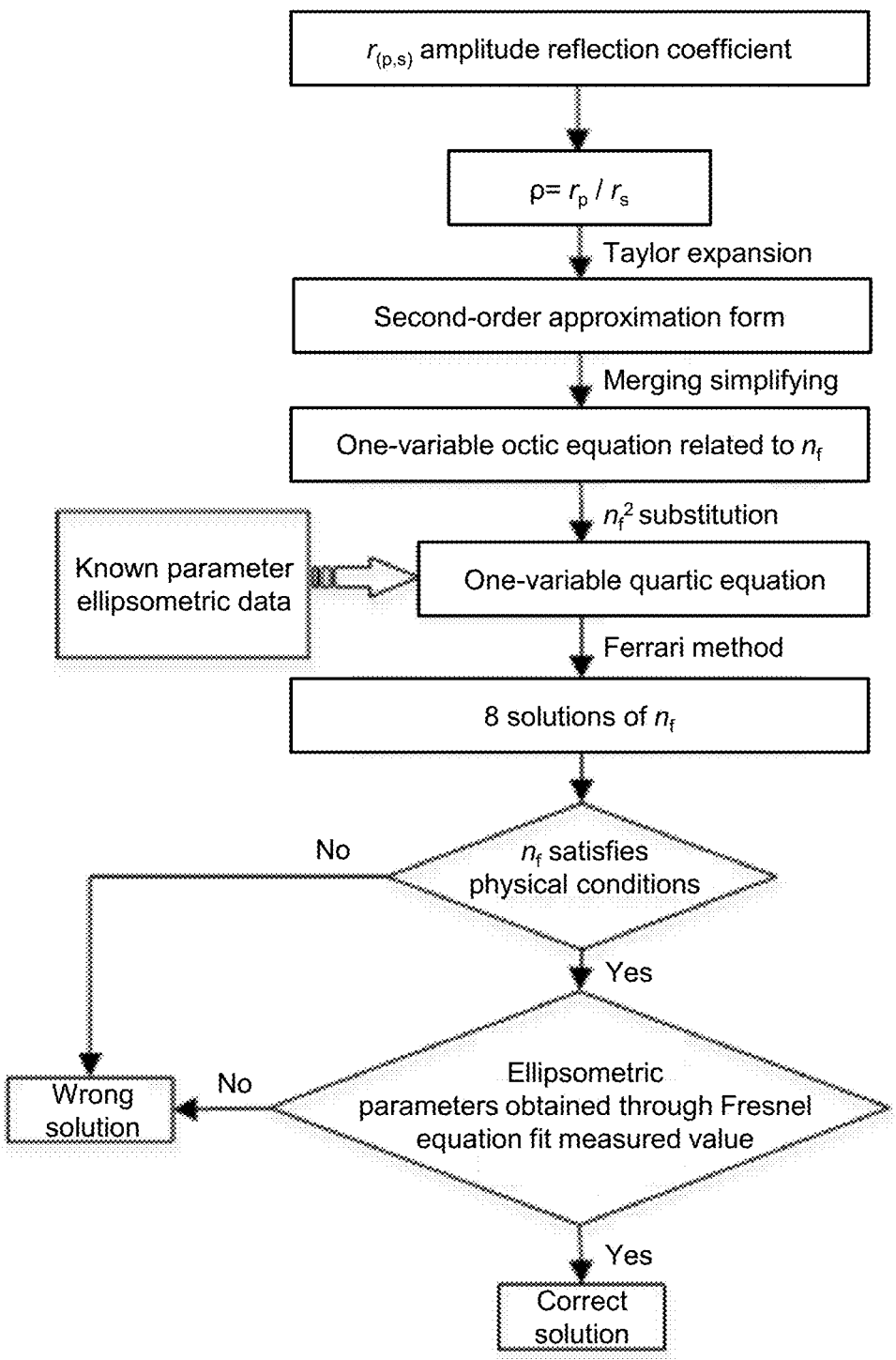
FIG. 1 is a flowchart illustrating a rapid measurement method for an ultra-thin film optical constant according to an embodiment of the invention.

As shown in FIG. 1, an embodiment of the invention provides a rapid measurement method for an ultra-thin film optical constant, which includes following steps:

S1: obtaining a p-light amplitude reflection coefficient $r_p$ and an s-light amplitude reflection coefficient $r_s$ of a light source (incident light) incident to an ultra-thin film to be measured, and using $r_p$ and $r_s$ to express an amplitude reflection coefficient ratio $$\rho = \frac{r_p}{r_s}.$$

To be specific, the p-light amplitude reflection coefficient $r_p$ is calculated according to a following equation:

$$r_p = \frac{n_{sub}\cos\alpha_{inc} - n_0\cos\alpha_{tra} + i\frac{2\pi d_f}{\lambda}(n_f^2\cos\alpha_{inc}\cos\alpha_{tra} - n_0 n_{sub} + n_0 n_{sub}^3 \sin^2\alpha_{tra}/n_f^2)}{n_{sub}\cos\alpha_{inc} + n_0\cos\alpha_{tra} + i\frac{2\pi d_f}{\lambda}(n_f^2\cos\alpha_{inc}\cos\alpha_{tra} + n_0 n_{sub} - n_0 n_{sub}^3 \sin^2\alpha_{tra}/n_f^2)}$$

Where $n_{sub}$ is an optical constant of a substrate used by the ultra-thin film (with a thickness smaller than 10 nm), $\alpha_{inc}$ is an incident angle of the incident light, $n_0$ is an optical constant of a surrounding medium of the ultra-thin film, $\alpha_{tra}$ is a refraction angle of the incident light transmitted to the substrate (a refraction angle of the incident light on the substrate), $d_f$ is a thickness of the ultra-thin film, $\lambda$ is a wavelength of the incident light, and $n_f$ is an optical constant of the ultra-thin film.

Further, the s-light amplitude reflection coefficient $r_s$ is calculated according to a following equation:

$$r_s = \frac{n_0\cos\alpha_{inc} - n_{sub}\cos\alpha_{tra} + i\frac{2\pi d_f}{\lambda}(n_0 n_{sub}\cos\alpha_{inc}\cos\alpha_{tra} + n_{sub}^2\cos\alpha_{inc}^2 - n_f^2)}{n_0\cos\alpha_{inc} + n_{sub}\cos\alpha_{tra} + i\frac{2\pi d_f}{\lambda}(n_0 n_{sub}\cos\alpha_{inc}\cos\alpha_{tra} - n_{sub}^2\cos\alpha_{inc}^2 + n_f^2)}$$

S2: performing a second-order Taylor expansion to $$\rho = \frac{r_p}{r_s}$$

at $d_f=0$ while taking $2\pi d_f/\lambda$ as a variable to obtain a second-order approximation form:

$$\rho \approx \rho_0 + i\rho'\frac{2\pi d_f}{\lambda} + (\rho_1'' + \rho_2'')\left(\frac{2\pi d_f}{\lambda}\right)^2$$

Where $\rho_0$ is an amplitude reflection coefficient ratio of the bare substrate, $d_f$ is a thickness of the ultra-thin film, $\lambda$ is a wavelength of the incident light, and $\rho'$, $\rho_1''$ and $\rho_2''$ are respectively coefficients.

To be specific, $\rho'$ is calculated according to a following equation:

$$\rho' = -2\frac{n_0}{n_{sub}^2 - n_0^2}\frac{\sin^2\alpha_{inc}\cdot\cos\alpha_{inc}}{\cos^2(\alpha_{inc} - \alpha_{tra})}\frac{(n_f^2 - n_0^2)\cdot(n_f^2 - n_{sub}^2)}{n_f^2}$$

Where $n_0$ is an optical constant of the surrounding medium of the ultra-thin film, $\alpha_{inc}$ is an incident angle of the incident light, $n_f$ is an optical constant of the ultra-thin film, $n_{sub}$ is an optical constant of the substrate used by the ultra-thin film, and $\alpha_{tra}$ is a refraction angle of the incident light transmitted to the substrate.

Further, $\rho_1''$ is calculated according to a following equation:

$$\rho_1'' = -2\frac{n_0 n_{sub}}{(n_{sub}^2 - n_0^2)^2}\cdot\frac{\sin^2\alpha_{inc}\cdot\cos^2\alpha_{inc}}{\cos^3(\alpha_{inc} - \alpha_{tra})}\left(\frac{(n_f^2 - n_0^2)(n_f^2 - n_{sub}^2)}{n_f^2}\right)^2$$

Further, $\rho_2''$ is calculated according to a following equation:

$$\rho_2'' = -2\frac{n_0}{n_{sub}}\frac{\cos\alpha_{inc}}{(n_{sub}^2 - n_0^2)^2}\cdot\frac{\sin^2\alpha_{inc}\cdot\cos\alpha_{inc}}{\cos^2(\alpha_{inc} - \alpha_{tra})}$$

$$\left(\frac{(n_f^2 - n_0^2)(n_f^2 - n_{sub}^2)}{n_f^2}\right)\frac{(n_f^2 - n_0^2)n_{sub}^4 + (n_f^2 - n_{sub}^2)n_f^2 n_0^2}{n_f^2}$$

S3: performing merging, simplifying and substituting processing to the second-order approximation form to transform the same into a one-variable quartic equation, which includes following sub-steps:

S31: letting:

$$A = -2\frac{n_0}{n_{sub}^2 - n_0^2}\frac{\sin^2\alpha_{inc}\cdot\cos\alpha_{inc}}{\cos^2(\alpha_{inc} - \alpha_{tra})}$$

$$B = -2\frac{n_0 n_{sub}}{(n_{sub}^2 - n_0^2)^2}\cdot\frac{\sin^2\alpha_{inc}\cdot\cos^2\alpha_{inc}}{\cos^3(\alpha_{inc} - \alpha_{tra})}$$

$$C = -2\frac{n_0}{n_{sub}}\frac{\cos\alpha_{inc}}{(n_{sub}^2 - n_0^2)^2}\cdot\frac{\sin^2\alpha_{inc}\cdot\cos\alpha_{inc}}{\cos^2(\alpha_{inc} - \alpha_{tra})}$$

$$D = \frac{2\pi d_f}{\lambda}$$

S32: introducing the above A-D to the second-order approximation form to obtain:

$$\rho = \rho_0 + iAD\frac{(n_f^2 - n_0^2)\cdot(n_f^2 - n_{sub}^2)}{n_f^2} + BD^2\left(\frac{(n_f^2 - n_0^2)(n_f^2 - n_{sub}^2)}{n_f^2}\right)^2 +$$

$$CD^2\left(\frac{(n_f^2 - n_0^2)(n_f^2 - n_{sub}^2)}{n_f^2}\right)\frac{(n_f^2 - n_0^2)n_{sub}^4 + (n_f^2 - n_{sub}^2)n_f^2 n_0^2}{n_f^2}$$

S33: expanding and simplifying the equation of the step S32 to obtain a one-variable quartic equation related to $n_f^2$: para4·$N_f^4$+para3·$N_f^3$+para2·$N_f^2$+para1·$N_f$+para0=0, specifically:

Letting:

$$N_f = n_f^2 \text{ and}$$

$$\rho = \rho_0 + iAD\frac{(n_f^2 - n_0^2) \cdot (n_f^2 - n_{sub}^2)}{n_f^2} + BD^2\left(\frac{(n_f^2 - n_0^2)(n_f^2 - n_{sub}^2)}{n_f^2}\right)^2 +$$

$$CD^2\left(\frac{(n_f^2 - n_0^2)(n_f^2 - n_0^2)}{n_f^2}\right)\frac{(n_f^2 - n_0^2)n_{sub}^4 + (n_f^2 - n_{sub}^2)n_f^2 n_0^2}{n_f^2}$$

simplifying
to obtain:

para4·$N_f^4$+para3·$N_f^3$+para2·$N_f^2$+para1·$N_f$+para0=0

Where, para0 is a constant term:

para0=$BD^2 n_0^4 n_{sub}^4 - CD^2 n_0^4 n_{sub}^6$ para1 is a one-order term coefficient:

para1=$iADn_0^2 n_{sub}^2 - 2BD^2 n_0^4 n_{sub}^2 - 2BD^2 n_0^2 n_{sub}^4 + 2CD^2 n_0^2 n_{sub}^6$ para2 is a quadratic term coefficient:

para2=$-iADn_0^2 + BD^2 n_0^4 - iADn_{sub}^2 + 4BD^2 n_0^2 n_{sub}^2 + 2CD^2 n_0^4 n_{sub}^2 + BD^2 n_{sub}^4 - CD^2 n_0^2 n_{sub}^4 - CD^2 n_{sub}^6 - \rho + \rho_0^4$ para3 is a cubic term coefficient:

para3=$iAD - 2BD^2 n_0^2 - CD^2 n_0^4 - 2BD^2 n_{sub}^2 - 2CD^2 n_0^2 n_{sub}^2 + CD^2 n_{sub}^4$ para4 is a quartic term coefficient:

para4=$BD^2 + CD^2 n_0^2$

S4: solving the one-variable quartic equation para4·$N_f^4$+para3·$N_f^3$+para2·$N_f^2$+para1·$N_f$+para0=0 to obtain 8 solutions of the optical constant of the ultra-thin film, and obtaining a correct solution through conditional judgment, where the correct solution is the optical constant of the ultra-thin film to be measured, so as to achieve the rapid measurement for the ultra-thin film optical constant. To be specific, a Ferrari method is adopted to get 4 solutions for the one-variable quartic equation related to $N_f$, and after the square root, 8 solutions of $n_f$ is obtained.

To be specific, the conditional judgment is performed in a following method to obtain the correct solution:

S41: excluding optical constant solutions according to physical conditions:

A refractive index n and an extinction coefficient k are required to satisfy following physical conditions: n=Re($n_f$)>0 and k=−Im($n_f$)>0, where Re($n_f$) represents a real part of the optical constant $n_f$, Im($n_f$) represents an imaginary part of the optical constant $n_f$, the corresponding refractive index n (n=Re ($n_f$)) and the extinction coefficient k (k=−Im ($n_f$)) are obtained according to real parts and imaginary parts of each of the optical constant solutions, and then most of the 8 solutions are excluded according to aforementioned physical conditions;

S42: excluding the remaining optical constant solutions by using a Fresnel equation:

The remaining optical constant solutions are introduced into the Fresnel equation to calculate ellipsometric parameters of the ultra-thin film, and determining which one is the correct solution according to a degree of fitness between the calculated ellipsometric parameters and ellipsometric parameters of the ultra-thin film obtained through the measurement, so as to obtain the unique correct solution. To be specific, the ellipsometric parameters of the ultra-thin film obtained through calculation and the ellipsometric parameters of the ultra-thin film obtained through the measurement are compared, and the solution corresponding to the ellipsometric parameter with the highest degree of fitness is the correct solution.

Before the method of the invention is used to measure the ultra-thin film optical constant $n_f$, following parameters are required to be determined: the surrounding medium of the ultra-thin film $n_0$, the optical constant of the substrate used by the ultra-thin film $n_{sub}$, the incident angle $\alpha_{inc}$ of the incident light, the amplitude reflection coefficient ratio $\rho_0$ of the substrate, the amplitude reflection coefficient $\rho$ of the ultra-thin film, the thickness $d_f$ of the ultra-thin film, the wavelength $\lambda$ of the incident light and the refraction angle $\alpha_{tra}$ of the incident light transmitted to the substrate.

To be specific, the optical constants of the thin film may vary along with a change of the wavelength, and measured wavelength ranges of different instruments are also different, so that an appropriate measurement wavelength range may be selected according to the measurement requirements and equipment conditions, for example, a single wavelength or spectrum measurement, and then the optical constant $n_0$ of the surrounding medium and the optical constant $n_{sub}$ of the substrate used by the ultra-thin film in the measurement wavelength range may be obtained, and in general, the surrounding medium in measurement is air, i.e. $n_0$=1. The optical constant of the substrate may be measured by an ellipsometer or other instrument, and if optical properties of the substrate are stable, known data in literatures may also be used. There is no specific requirement on the incident angle $\alpha_{inc}$ of the incident light, which may be selected according to actual needs to ensure validity of the measured data, for example, 60°, 65° or 70°.

Regarding the amplitude reflection coefficient ratio $\rho_0$ of the substrate, a calculation equation thereof is: $\rho_0$=tan($\psi_{sub}$) exp($i\Delta_{sub}$), and in the actual operation, the ellipsometric parameters of the substrate: an amplitude ratio $\Psi_{sub}$ and a phase difference $\Delta_{sub}$ are obtained by using a general ellipsometer, an imaging ellipsometer, a Mueller matrix ellipsometer or other instruments capable of obtaining the ellipsometric parameter information of the sample, and after the ellipsometric parameters $\Psi_{sub}$ and $\Delta_{sub}$ are obtained, the equation $\rho_0$=tan($\Psi_{sub}$)exp($i\Delta_{sub}$) is used to calculate the amplitude reflection coefficient ratio $\rho_0$ of the substrate.

Regarding the amplitude reflection coefficient ratio $\rho$ of the ultra-thin film in the final one-variable quartic equation, a calculation equation thereof is $\rho$=tan($\Psi_f$)exp($i\Delta_f$), and in the actual operation, the ellipsometric parameters of the ultra-thin film: an amplitude ratio $\Psi_f$ and a phase difference $\Delta_f$ are obtained by using a general ellipsometer, an imaging ellipsometer, a Mueller matrix ellipsometer or other instruments capable of obtaining the ellipsometric parameter information of the sample, and after the ellipsometric parameters $\Psi_f$ and $\Delta_f$ are obtained, the equation $\rho$=tan($\Psi_f$)exp($i\Delta_f$) is used to calculate the amplitude reflection coefficient ratio $\rho$ of the ultra-thin film.

The thickness $d_f$ of the ultra-thin film may be determined according to measurement approaches of AFM, SEM or the like. Regarding the wavelength $\lambda$ of the incident light, a range thereof is determined according to an actual requirement. To be specific, the method of the invention may implement calculation of the optical constants of two-dimensional materials from an ultraviolet band to an infrared band, and implement calculation of the optical constants of ordinary ultra-thin films (with a thicknesses less than 10 nm) from a partial visible light band to the infrared band can be calculated. The refraction angle $\alpha_{tra}$ of the incident light transmitted to the substrate is calculated according to a following equation:

$$n_0 \sin(\alpha_{inc}) = n_{sub} \sin(\alpha_{tra})$$

An embodiments of the invention is provided below, and in the embodiment, a spectroscopic ellipsometer is used to measure a GaAs film with a thickness of 3 nm ($d_f$=3 nm) on a silicon substrate, and the optical constants of the ultra-thin film are rapidly calculated by introducing the ellipsometric parameters of the substrate and the thin film to an optical constant solving process.

Figure 2:
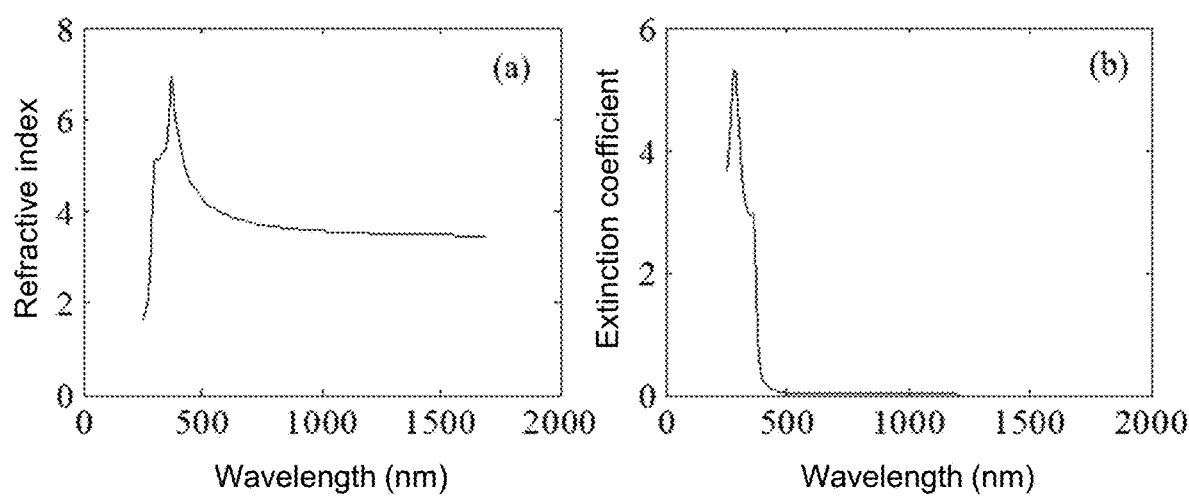
FIG. 2 illustrates spectrum curves of optical constants in 250-1690 nm waveband of a silicon substrate according to an embodiment of the invention, where (a) is reflective index, and (b) is extinction coefficient.
Figure 3:
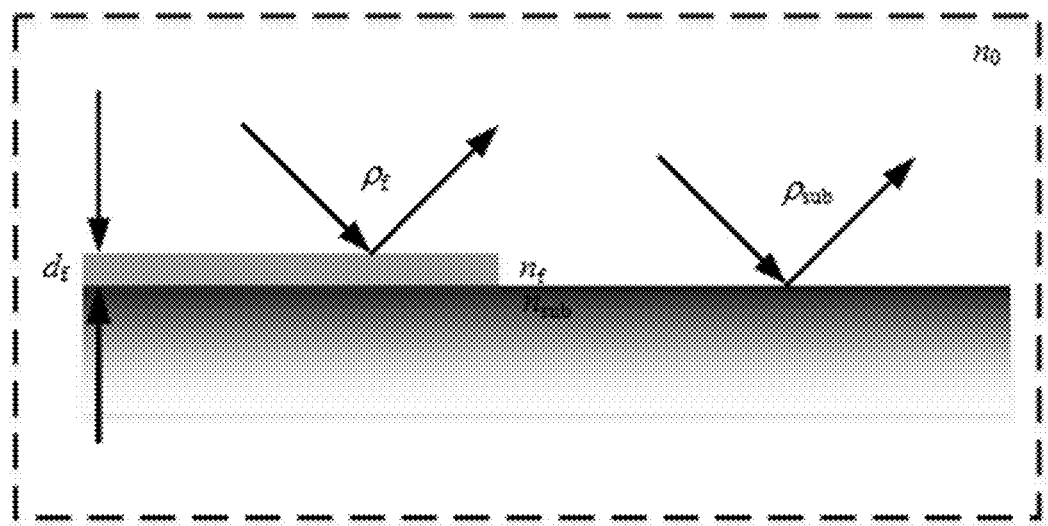
FIG. 3 is a schematic diagram of an optical model of a GaAs film sample on the silicon substrate according to an embodiment of the invention.
Figure 4:
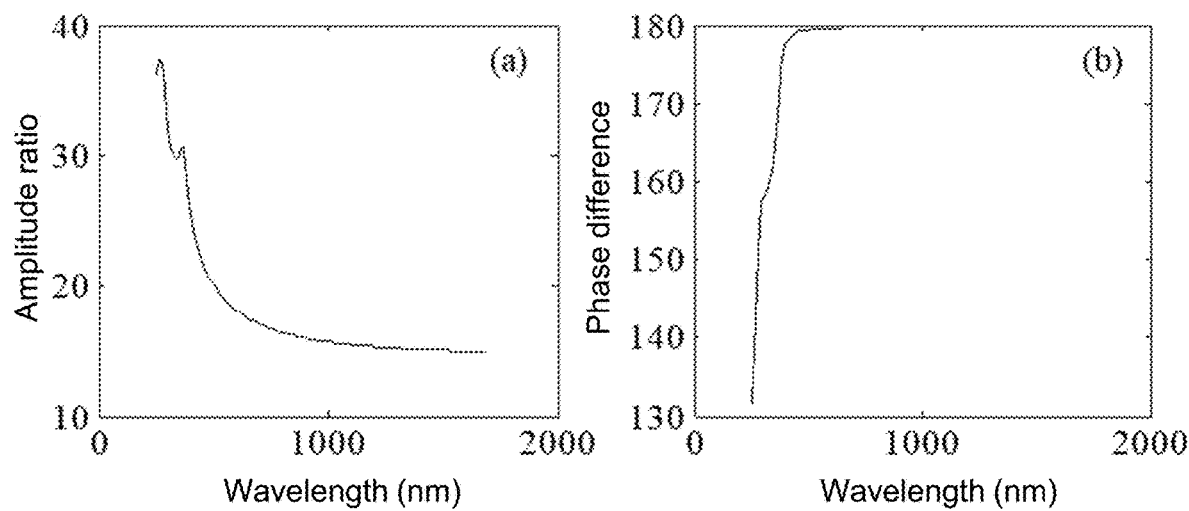
FIG. 4 illustrates spectrum curves of ellipsometric parameters in 250-1690 nm waveband of the silicon substrate according to an embodiment of the invention, where (a) is amplitude ratio, and (b) is phase difference.
Figure 5:
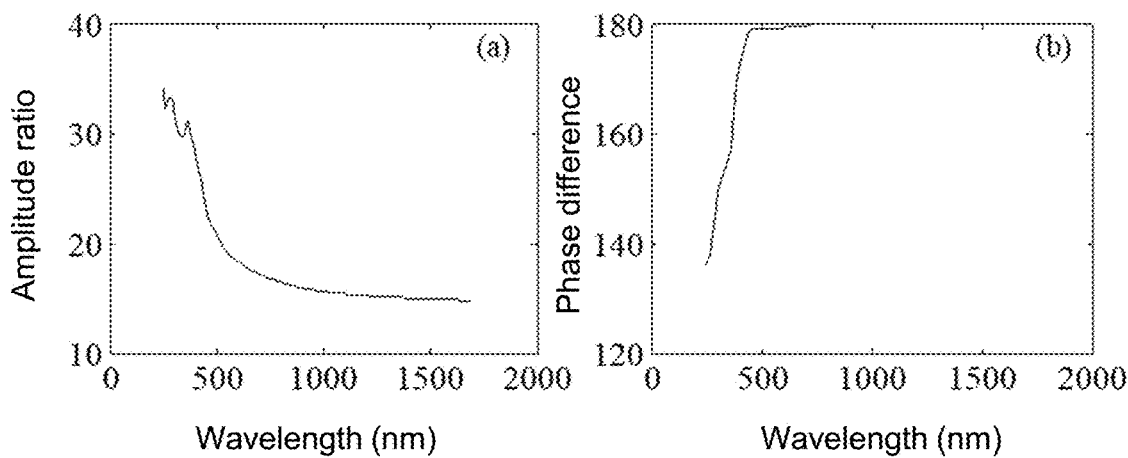
FIG. 5 illustrates spectrum curves of GaAs film ellipsometric parameters in 250-1690 nm waveband on the silicon substrate according to an embodiment of the invention, where (a) is amplitude ratio, and (b) is phase difference.
Figure 6:
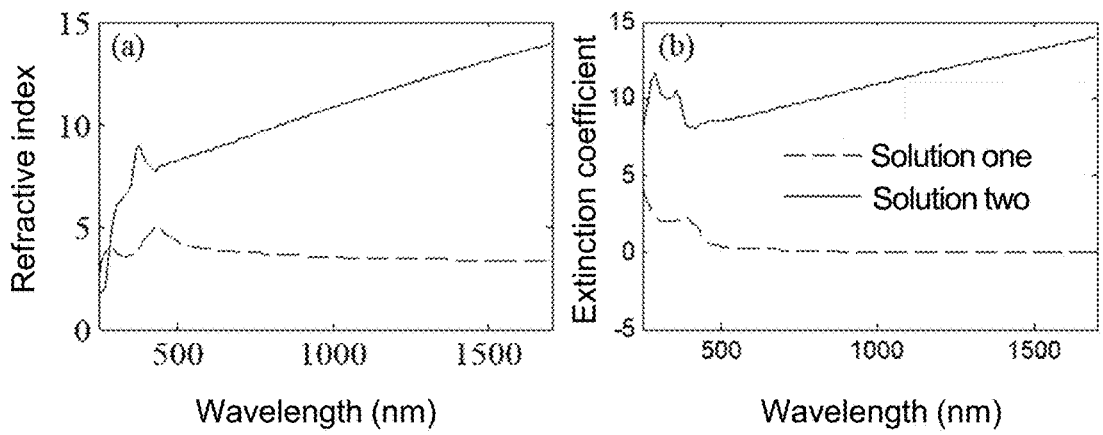
FIG. 6 illustrates spectrum curves of calculated GaAs optical constants (two sets) in 250-1690 nm waveband according to an embodiment of the invention, where (a) is reflective index, and (b) is extinction coefficient.
Figure 7:
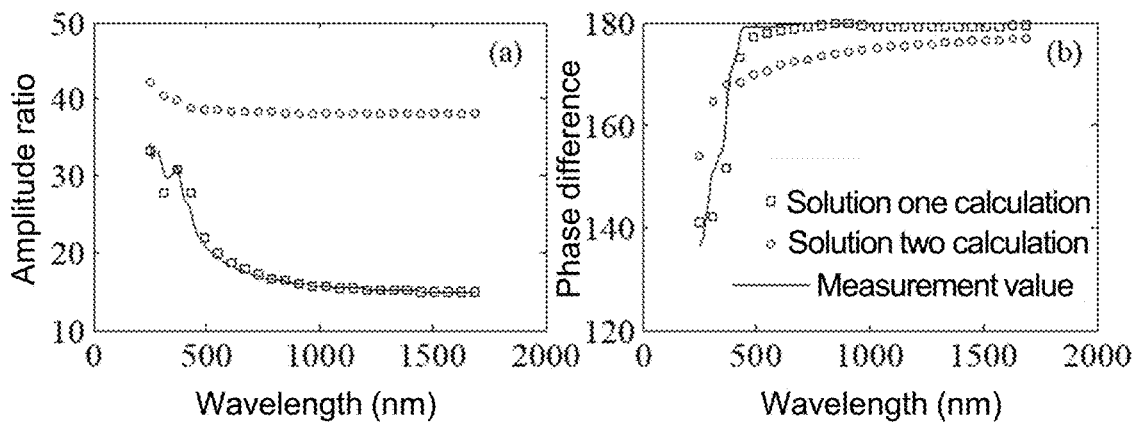
FIG. 7 illustrates spectrum curves of ellipsometric parameters obtained through inversion of two sets of optical constant solutions and ellipsometric parameters obtained through measurement in 250-1690 nm waveband according to an embodiment of the invention, where (a) is amplitude ratio, and (b) is phase difference.
Figure 8:
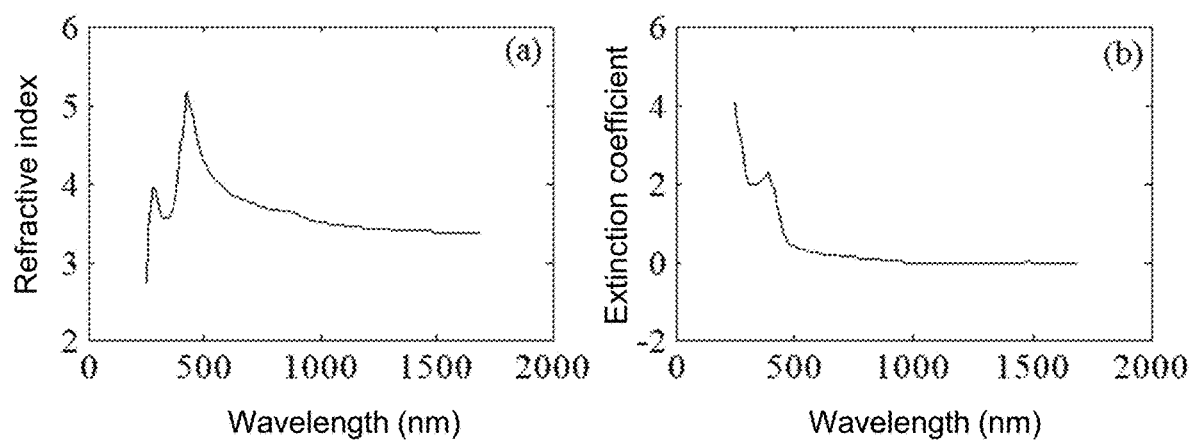
FIG. 8 illustrates spectrum curves of calculated GaAs optical constants (unique correct solution) in 250-1690 nm waveband according to an embodiment of the invention, where (a) is reflective index, and (b) is extinction coefficient.

First, various parameters are obtained, and the spectroscopic ellipsometer is adopted in the embodiment, the measurement wavelength range is $\Gamma$=[250, 1690] nm, and the optical constant $n_0$ of the surrounding medium of the ultra-thin film and the optical constant $n_{sub}$ of the substrate in the wavelength range of [250, 1690] nm are obtained, and in the measurement, the surrounding medium is air $n_0$=1, the substrate is made of silicon, optical constants of the silicon is relatively stable, and the optical constants of the silicon substrate are shown in FIG. 2; the measured incident angle $\alpha_{inc}$=65° is selected; the refraction angle $\alpha_{tra}(\lambda)$ of the incident light transmitted to the silicon substrate is calculated according to the equation: $n_0 \sin(\alpha_{inc}) = n_{sub}(\lambda)\sin(\alpha_{tra}(\lambda))$; the ellipsometric parameters $\Psi_{sub}(\lambda)$ and $\Delta_{sub}(\lambda)$ of the silicon substrate are measured, and a measured optical model is shown in FIG. 3, the measured ellipsometric parameters of the silicon substrate is as shown in FIG. 4, and after the spectroscopic ellipsometer is adopted to obtain data, the amplitude reflection coefficient ratio $\rho_0$ of the substrate is calculated: $\rho_0 = \rho_{sub}(\lambda) = \tan(\Psi_{sub}(\lambda))\exp(i\Delta_{sub}(\lambda))$; the ellipsometric parameters $\Psi_f(\lambda)$ and $\Delta_f(\lambda)$ of the GaAs film are calculated, the spectroscopic ellipsometer is used the same as the previous step, and a measurement result is shown in FIG. 5, and after data is obtained, the amplitude reflection coefficient ratio $\rho$ of the GaAs ultra-thin film is calculated: $\rho = \rho_f(\lambda) = \tan(\Psi_f(\lambda))\exp(i\Delta_f(\lambda))$ Then, the aforementioned obtained various parameters are introduced into the one-variable quartic equation para4·$N_f^4$+para3·$N_f^3$+para2·$N_f^2$+para1·$N_f$+para0=0 to calculate the optical constants $n_f(\lambda)$ of the GaAs film. 8 optical constants of the GaAs film are obtained according to the above calculation process, and positive and negative of the refractive index and of the extinction coefficient are used to exclude 6 of the 8 solutions, and the remained two solutions (i.e. two sets of optical constants) are as shown in FIG. 6, and two sets of ellipsometric parameters of the ultra-thin film are obtained by inversion of the remained two sets of optical constants introduced into the Fresnel equation, and then the calculated ellipsometric parameters are compared with measurement values (i.e. the measured ellipsometric parameters of the ultra-thin film), as shown in FIG. 7, and the solution corresponding to the ellipsometric parameter having the highest degree of fitness with the measurement value is selected as the correct solution of the optical constant of the GaAs film, as shown in FIG. 8.

In the aforementioned embodiment, the ellipsometer is adopted for measurement, for example, a laser ellipsometer is used to implement calculation of ultra-thin film single waveform optical constants. In the aforementioned calculation process, only the GaAs film on the silicon substrate is taken as an example for description, and for other types of ultra-thin films or different types of substrates, rapid measurement of optical constants may also be performed according to the same method.

In summary, in the rapid measurement method for the ultra-thin film optical constant, by performing Taylor second-order expansion to the amplitude reflection coefficient ratio $\rho$, a second-order equation is adapted to achieve an approximation of the original amplitude reflection coefficient ratio $\rho$, at the same time, a non-linear equation that is originally unable to obtain analytical solutions is transformed into a one-variable quartic equation, so as to obtain the analytical solutions of the ultra-thin film optical constant to achieve rapid measurement and calculation of the ultra-thin film optical constant.

It will be apparent to those skilled in the art that various modifications and variations can be made to the disclosed embodiments without departing from the scope or spirit of the invention, for example, to use other instruments capable of measuring polarization information, or replacing the type of the ultra-thin film or the substrate, etc. In view of the foregoing, it is intended that the invention covers modifications and variations provided they fall within the scope of the following claims and their equivalents.

What is claimed is:

1. A rapid measurement method for an ultra-thin film optical constant, comprising:

S1: irradiating an incident light to an ultra-thin film disposed on a substrate, wherein the ultra-thin film is located between a source of the incident light and the substrate, controlling instruments to measure an incident angle of the incident light and a refraction angle of the incident light transmitted to the substrate, calculating, a p-light amplitude reflection coefficient $r_p$ and an s-light amplitude reflection coefficient $r_s$ of the incident light irradiating to the ultra-thin film, and then obtaining a measured amplitude reflection coefficient ratio $\rho$ of the ultra-thin film:

$$\rho = \frac{r_p}{r_s};$$

S2: performing an approximation form of $\rho$ to satisfy a following equation:

$$\rho \approx \rho_0 + i\rho' \frac{2\pi d_f}{\lambda} + (\rho_1'' + \rho_2'')\left(\frac{2\pi d_f}{\lambda}\right)^2$$

where $\rho_0$ is an amplitude reflection coefficient ratio of the substrate, $d_f$ is a thickness of the ultra-thin film, $\lambda$ is a wavelength of the incident light, and $\rho'$, $\rho_1$" and $\rho_2$" are all coefficients;

S3: transforming the approximation form of $\rho$ into a one-variable quartic equation; and S4: controlling the instruments to measure measured-ellipsometric parameters of the ultra-thin film, and then completing the rapid measurement for the ultra-thin film optical constant to be measured by obtaining a correct solution of the one-variable quartic equation defined by the measured amplitude reflection coefficient ratio $\rho$, wherein the ultra-thin film optical constant to be measured satisfies following conditions:

the correct solution is the optical constant of the ultra-thin film to be measured;

according to a degree of fitness, ellipsometric parameters of the correct solution is consistent with the measured-ellipsometric parameters of the ultra-thin film, wherein the ellipsometric parameters of the correct solution is calculated by a Fresnel equation;

the correct solution is one of a plurality of solutions of the one-variable quartic equation; and the correct solution satisfies a conditional judgment, wherein the conditional judgment comprises: excluding optical constant solutions of the one-variable quartic equation that do not satisfy physical conditions.

2. The rapid measurement method the ultra-thin film optical constant as claimed in claim 1, wherein the p-light amplitude reflection coefficient $r_p$ is calculated according to a following equation:

$$r_p = \frac{n_{sub}\cos\alpha_{inc} - n_0\cos\alpha_{tra} + i\frac{2\pi d_f}{\lambda}\left(n_f^2\cos\alpha_{inc}\cos\alpha_{tra} - n_0 n_{sub} + n_0 n_{sub}^3 \sin^2\alpha_{tra}/n_f^2\right)}{n_{sub}\cos\alpha_{inc} + n_0\cos\alpha_{tra} + i\frac{2\pi d_f}{\lambda}\left(n_f^2\cos\alpha_{inc}\cos\alpha_{tra} + n_0 n_{sub} - n_0 n_{sub}^3 \sin^2\alpha_{tra}/n_f^2\right)}$$

wherein $n_{sub}$ is an optical constant of the substrate used by the ultra-thin film, $\alpha_{inc}$ is the incident angle of the incident light, no is an optical constant of a surrounding medium of the ultra-thin film, $\alpha_{tra}$ is the refraction angle of the incident light transmitted to the substrate, $d_f$ is a thickness of the ultra-thin film, $\lambda$ is a wavelength of the incident light, and $n_f$ is an optical constant of the ultra-thin film to be measured.

3. The rapid measurement method for the ultra-thin film optical constant as claimed in claim 1, wherein the s-light amplitude reflection coefficient $r_s$ is calculated according to a following equation:

$$r_s = \frac{n_0\cos\alpha_{inc} - n_{sub}\cos\alpha_{tra} + i\frac{2\pi d_f}{\lambda}\left(n_0 n_{sub}\cos\alpha_{inc}\cos\alpha_{tra} + n_{sub}^2\cos\alpha_{inc}^2 - n_f^2\right)}{n_0\cos\alpha_{inc} + n_{sub}\cos\alpha_{tra} + i\frac{2\pi d_f}{\lambda}\left(n_0 n_{sub}\cos\alpha_{inc}\cos\alpha_{tra} - n_{sub}^2\cos\alpha_{inc}^2 + n_f^2\right)}$$

where $n_{sub}$ is an optical constant of the substrate used by the ultra-thin film, $\alpha_{inc}$ is the incident angle of the incident light, no is an optical constant of a surrounding medium of the ultra-thin film, $\alpha_{tra}$ is the refraction angle of the incident light transmitted to the substrate, $d_f$ is a thickness of the ultra-thin film, $\lambda$ is a wavelength of the incident light, and $n_f$ is an optical constant of the ultra-thin film to be measured.

4. The rapid measurement method for the ultra-thin film optical constant as claimed in claim 1, wherein $\rho'$ is calculated according to a following equation:

$$\rho' = -2\frac{n_0}{n_{sub}^2 - n_0^2}\frac{\sin^2\alpha_{inc}\cdot\cos\alpha_{inc}}{\cos^2(\alpha_{inc}-\alpha_{tra})}\frac{(n_f^2-n_0^2)\cdot(n_f^2-n_{sub}^2)}{n_f^2}$$

where $n_0$ is an optical constant of a surrounding medium of the ultra-thin film, $a_{inc}$ is the incident angle of the incident light, of is an optical constant of the ultra-thin film to be measured, $n_{sub}$ is an optical constant of the substrate used by the ultra-thin film, and $\alpha_{tra}$ is the refraction angle of the incident light transmitted to the substrate.

5. The rapid measurement method for the ultra-thin film optical constant as claimed in claim 1, wherein $\rho_1''$ is calculated according to a following equation:

$$\rho_1'' = -2\frac{n_0 n_{sub}}{(n_{sub}^2-n_0^2)^2}\cdot\frac{\sin^2\alpha_{inc}\cdot\cos^2\alpha_{inc}}{\cos^3(\alpha_{inc}-\alpha_{tra})}\left(\frac{(n_f^2-n_0^2)(n_f^2-n_{sub}^2)}{n_f^2}\right)^2$$

where $n_0$ is an optical constant of a surrounding medium of the ultra-thin film, $\alpha_{inc}$ is the incident angle of the incident light, of is an optical constant of the ultra-thin film to be measured, $n_{sub}$ is an optical constant of the substrate used by the ultra-thin film, and $\alpha_{tra}$ is the refraction angle of the incident light transmitted to the substrate.

6. The rapid measurement method for the ultra-thin film optical constant as claimed in claim 1, wherein $\rho_2''$ is calculated according to a following equation:

$$\rho_2'' = -2\frac{n_0}{n_{sub}}\frac{\cos\alpha_{inc}}{(n_{sub}^2-n_0^2)^2}\cdot\frac{\sin^2\alpha_{inc}\cdot\cos\alpha_{inc}}{\cos^2(\alpha_{inc}-\alpha_{tra})}$$
$$\left(\frac{(n_f^2-n_0^2)(n_f^2-n_{sub}^2)}{n_f^2}\right)\left(\frac{(n_f^2-n_0^2)n_{sub}^4+(n_f^2-n_{sub}^2)n_f^2 n_0^2}{n_f^2}\right)$$

where $n_0$ is an optical constant of a surrounding medium of the ultra-thin film, $\alpha_{inc}$ is the incident angle of the incident light, $n_f$ is an optical constant of the ultra-thin film to be measured, $n_{sub}$ is an optical constant of the substrate used by the ultra-thin film, and $\alpha_{tra}$ is the refraction angle of the incident light transmitted to the substrate.

7. The rapid measurement method for the ultra-thin film optical constant as claimed in claim 1, wherein the step S3 of performing merging, simplifying and substituting processing to the second-order approximation form for transforming the same into the one-variable quartic equation comprises:

S31: letting:

$$A = -2\frac{n_0}{n_{sub}^2-n_0^2}\frac{\sin^2\alpha_{inc}\cdot\cos\alpha_{inc}}{\cos^2(\alpha_{inc}-\alpha_{tra})}$$

$$B = -2\frac{n_0 n_{sub}}{(n_{sub}-n_0)^2}\cdot\frac{\sin^2\alpha_{inc}\cdot\cos^2\alpha_{inc}}{\cos^3(\alpha_{inc}-\alpha_{tra})}$$

$$C = -2\frac{n_0}{n_{sub}}\frac{\cos\alpha_{inc}}{(n_{sub}^2-n_0^2)^2}\cdot\frac{\sin^2\alpha_{inc}\cdot\cos\alpha_{inc}}{\cos^2(\alpha_{inc}-\alpha_{tra})}$$

$$D = \frac{2\pi d_f}{\lambda}$$

S32: simplifying the second-order approximation form into:

$$\rho = \rho_0 + iAD\frac{(n_f^2-n_0^2)\cdot(n_f^2-n_{sub}^2)}{n_f^2} + BD^2\left(\frac{(n_f^2-n_0^2)(n_f^2-n_{sub}^2)}{n_f^2}\right)^2 +$$

-continued $$CD^2\left(\frac{(n_f^2-n_0^2)(n_f^2-n_{sub}^2)}{n_f^2}\right)\frac{(n_f^2-n_0^2)n_{sub}^4+(n_f^2-n_{sub}^2)n_f^2n_0^2}{n_f^2}$$

S33: expanding and simplifying the equation of the step S32 to obtain a one-variable quartic equation related to $n_f^2$:

para4·$N_f^4$+para3·$N_f^3$+para2·$N_f^2$+para1·$N_f$+para0=0 where $N_f=n_f^2$, para0, para1, para2, para3 and para4 are respectively a constant term, a one-order term coefficient, a quadratic term coefficient, a cubic term coefficient and a quartic term coefficient.

8. The rapid measurement method for the ultra-thin film optical constant as claimed in claim 7, wherein the constant term para0, the one-order term coefficient para1, the quadratic term coefficient para2, the cubic term coefficient para3 and the quartic term coefficient para4 are represented as:

para0=$BD^2n_0^4n_{sub}^4-CD^2n_0^4n_{sub}^6$ para1=$iADn_0^2n_{sub}^2-2BD^2n_0^4n_{sub}^2-2BD^2n_0^2n_{sub}^4+2CD^2n_0^2n_{sub}^6$ para2=$-iADn_0^2+BD^2n_0^4-iADn_{sub}^2+4BD^2n_0^2n_{sub}^2+2CD^2n_0^4n_{sub}^2+BD^2n_{sub}^4-CD^2n_0^2n_{sub}^4-CD^2n_{sub}^6-\rho+\rho_0$ para3=$iAD-2BD^2n_0^2-CD^2n_0^4-2BD^2n_{sub}^2-2CD^2n_0^2n_{sub}^2+CD^2n_{sub}^4$ para4=$BD^2+CD^2n_0^2$.

* * * * *